United States Patent
Longdill et al.

(10) Patent No.: US 7,316,594 B2
(45) Date of Patent: Jan. 8, 2008

(54) WHEEL SUSPENSION AND RETRACTION SYSTEM

(75) Inventors: Simon James Longdill, Auckland (NZ); Hans Weekers, Auckland (NZ); Stephen John Briggs, Auckland (NZ)

(73) Assignee: Gibbs Tehnologies Ltd, Warwicksire (GB)

( * ) Notice: Subject to any disclaimer, the term of this patent is extended or adjusted under 35 U.S.C. 154(b) by 0 days.

(21) Appl. No.: 11/256,209

(22) Filed: Oct. 21, 2005

(65) Prior Publication Data
US 2006/0234567 A1 Oct. 19, 2006

(30) Foreign Application Priority Data
Oct. 22, 2004 (GB) .................. 0423474.6

(51) Int. Cl.
*B60F 3/00* (2006.01)
(52) U.S. Cl. ..................................... 440/12.5
(58) Field of Classification Search ............ 440/12.5; 280/43, 43.17, 43.23
See application file for complete search history.

(56) References Cited

U.S. PATENT DOCUMENTS

| | | | |
|---|---|---|---|
| 2,350,037 A | 5/1944 | Hofheins et al. | |
| 3,280,785 A | 10/1966 | Mycroft | |
| 3,903,831 A | 9/1975 | Bartlett et al. | |
| 4,241,686 A | 12/1980 | Westphalen | |
| 4,387,661 A | 6/1983 | Duff | |
| 4,958,584 A | 9/1990 | Williamson | |
| 5,570,653 A * | 11/1996 | Gere et al. ............... | 440/12.51 |
| 5,590,617 A * | 1/1997 | Gere et al. ............... | 440/12.51 |
| 5,690,046 A | 11/1997 | Grzech, Jr. | |
| 5,755,173 A | 5/1998 | Rorabaugh et al. | |
| RE36,901 E | 10/2000 | Roycroft et al. | |
| 6,808,430 B1 | 10/2004 | March | |
| 6,945,832 B2 | 9/2005 | Roycroft | |
| 2003/0176119 A1* | 9/2003 | Royle ...................... | 440/12.54 |
| 2004/0112661 A1* | 6/2004 | Royle ........................ | 180/209 |

FOREIGN PATENT DOCUMENTS

| | | |
|---|---|---|
| GB | 2134857 | 8/1984 |
| GB | 2254831 A | 10/1992 |
| GB | 2397344 A | 7/2004 |
| JP | 63-002712 A1 | 7/1988 |
| WO | 2002-16152 A1 | 2/2002 |
| WO | 2004-087443 A1 | 10/2004 |
| WO | 2004-103741 A1 | 12/2004 |

* cited by examiner

*Primary Examiner*—Stephen Avila
(74) *Attorney, Agent, or Firm*—Fulwider Patton LLP

(57) ABSTRACT

A mechanism is provided by which the wheels of an amphibious vehicle are simultaneously retracted or protracted for switching between a land mode and a marine mode of operation. Each of a transversely spaced pair of wheels is supported by a horizontally arranged spring and damper combination acting on at least one suspension link. Each spring and damper combination is in turn supported by a movable anchor point, the position of which determines the extent of protraction or retraction of the associated wheel. The anchor points for the two wheels may be located at opposite ends of a rotatable rocker member, the rotational orientation of which is determined by an actuator taking the form of for example a hydraulic ram or electric motor.

20 Claims, 11 Drawing Sheets

WHEEL SUSPENSION AND RETRACTION SYSTEM

CROSS-REFERENCES TO RELATED APPLICATIONS

This application claims priority from Great Britain Application Ser. No. 0423474.6, filed Oct. 22, 2004.

BACKGROUND OF THE INVENTION

The present invention relates to a wheel suspension and retraction system, more particularly to a retraction arrangement for an amphibious vehicle capable of powered travel on land and water. The invention has particular, but not exclusive, application for an amphibious vehicle in which a user sits astride the vehicle in the manner of a motorcycle, jet ski, quad bike, or the like.

Amphibious vehicles capable of powered travel on both land and water are known. In a typical arrangement, a prime mover (such as an engine or electric motor) is arranged to provide drive to a marine propulsion unit to propel the vehicle on water and to one or more road wheels for travel on land.

Because of the need to drive a marine propulsion unit and at least one road wheel, the power train of an amphibious vehicle is often more complex than that of a conventional road going vehicle or marine-only craft. This can give rise to difficulties in designing a power train to be accommodated in the limited available space, whilst also ensuring that the weight distribution is satisfactory for both land and marine usage. This problem is particularly acute for smaller "sit-astride" type amphibious vehicles that are similar in form to motorcycles, jet-skis, or quad bikes. Such vehicles tend to have narrower, taller bodywork that makes it difficult to accommodate a conventional amphibious vehicle power train.

The problems associated with amphibious vehicles are not limited to the arrangement of the power train, since the limitations of space also have an impact on other aspects of amphibious vehicle design. For example, the suspension for the road wheels has to be accommodated alongside the power train. This can be a particular problem in the case of an amphibious vehicle in which the road wheels are retractable when the vehicle is being used for marine travel.

U.S. Pat. No. 3,903,831 (Bartlett) is one of many prior art examples of amphibious vehicle wheel retraction arrangements. It uses a single hydraulic ram to retract both of the vehicle's front wheels via a rotatable shaft and a series of linkages and chain drives. The use of a single ram to retract two wheels is attractive; but Bartlett's system has many practical drawbacks. For example, it does not disclose shock absorbers (also known as dampers), and wheel suspension is provided using leaf springs and a single rigid axle. Leaf springs are heavy, bulky, and liable to unpredictable onset of inter-leaf friction, especially as the vehicle ages and corrosion sets in. Furthermore, the live axle design used in U.S. Pat. No. 3,903,831, which is almost extinct in contemporary passenger car production, commits a vehicle builder using Bartlett's design to standards of ride and handling which would be uncompetitive against modern light road vehicles. It should be noted that Bartlett's vehicle is an amphibious motor home; while leaf sprung live axles are still common for heavy vehicles, it is imperative for a smaller vehicle to offer independent wheel springing.

Further examples of retractable suspensions may be seen in U.S. Pat. No. 5,755,173 (Rorabaugh), U.S. Pat. No. 5,590,617 (Aquastrada), U.S. Pat. No. 4,958,584, (Williamson), and U.S. Pat. No. 4,241,686 (Westphalen). U.S. Pat. No. 5,590,617 utilises a dual-piston hydraulic ram as an actuator for retracting a pair of wheels, whereas a lead screw is used in the other cases. In all of these designs, use of a single actuator for pairs of wheels and their associated suspension arrangements is apparently a good way to save money and weight; but it is clear from the cross-sectional views provided in each of these patents that all of these retraction arrangements take up a lot of room in terms of height and width.

There is a need, therefore, for an amphibious vehicle having an improved or alternative arrangement for retraction of the wheels that can be more easily accommodated in a smaller space, particularly, but not exclusively, for a sit-astride type amphibious vehicle.

Japanese patent application JP-63-002712A1 of Ishida describes an amphibious vehicle with retractable wheels. The retractable wheels are arranged in pairs longitudinally, fore and aft, along the vehicle; w. With the wheels of each pair connected to a common rocker member whose rotation can raise or lower the wheels. A separate spring and damper assembly is provided for each wheel. The front wheels are not connected to a common rocker arm, nor are the back wheels. This requires a mechanism which extends along the length of the vehicle, which is difficult to package. It mandates deep and wide bodyside cavities, making occupant access difficult, and would raise the vehicle's center of gravity when compared to a conventional suspension, increasing roll angles on land and on water, and with negative effects on ride motions. Ishida requires this packaging to enable easy connection of each rocker arm to a manually windable handle accessible from the vehicle cabin. The rocker arm of Ishida is a straight member and the wheels of Ishida on retraction pivot about axes running transversely, left to right, across the vehicle. This in turn dictates a suspension geometry of pure leading and trailing arms. This allows negligible camber change on corners, severely limiting roadholding on land. A single suspension arm to a front wheel in particular, may lead to considerable problems with wheel shimmy, and associated unpleasant feedback through the steering system.

SUMMARY OF THE INVENTION

In a first aspect the present invention provides a wheel suspension and retraction system for an amphibious vehicle comprising:

- a pair of wheels spaced apart transversely across the vehicle, each wheel mounted for rotation on a hub assembly;
- suspension linkages for the wheels connecting the hub assemblies to a common rocker member via spring and damper assemblies, one spring and damper assembly for each wheel, with the rocker member mounted for rotation about a pivot axis and a first of the wheels being connected via an associated suspension linkage to the rocker member on one side of the pivot axis and a second of the wheels being connected via an associated suspension linkage to the rocker member on the other side of the pivot axis;
- an actuator connected to the rocker member for rotating the rocker member about the pivot axis thereof, with rotation in one sense retracting the wheels to raised marine mode locations and with rotation in an opposite sense protracting the wheels to lowered land mode locations; wherein:

the suspension linkages each extend transversely across the vehicle to the rocker member which is mounted for rotation at a location lying inboard of the pair of wheels.

In a second aspect the present invention provides a wheel suspension and retraction system for an amphibious vehicle comprising:

a pair of wheels each mounted for rotation on a hub assembly;

suspension linkages for the wheels connecting the hub assemblies to a common Z-shaped rocker member via spring and damper assemblies, one spring and damper assembly for each wheel, the pivot member having a central section through which passes a rocker axis of the rocker member, a first of the wheels being connected via an associated suspension linkage to one end section of the rocker member on a first side of the pivot axis and a second of the wheels being connected via an associated suspension linkage to the other end section of rocker member on the other side of the pivot axis; and an actuator connected to the rocker member for rotating the rocker member about the pivot axis thereof, with rotation in one sense retracting the wheels to raised marine mode locations and with rotation in an opposite sense protracting the wheels to lowered land mode locations.

In a third aspect the present invention provides a wheel suspension and retraction system for an amphibious vehicle with a hull, the system comprising:

a pair of wheels each mounted for rotation on a hub assembly;

suspension linkages for the wheels connecting the hub assemblies to a common rocker member via spring and damper assemblies, one spring and damper assembly for each wheel, with the rocker member mounted for rotation about a pivot axis and a first of the wheels being connected via an associated suspension linkage to the rocker member on one side of the pivot axis and a second of the wheels being connected via an associated suspension linkage to the rocker member on the other side of the pivot axis;

an actuator connected to the rocker member for rotating the rocker member about the pivot axis thereof, with rotation in one sense retracting the wheels to raised marine mode locations and with rotation in an opposite sense protracting the wheels to lowered land mode locations; wherein:

each suspension linkage comprises a suspension arm pivotally connected at a distal end, the end furthest from a vehicle centre line when the wheels are in their lowered land mode locations, to a hub assembly and attached at a proximal end to a rotatable suspension shaft for rotation with the shaft, the shaft also forming part of the suspension linkage; and each rotatable suspension shaft extends through the hull and an annular seal provides a water resistant seal around the shaft as the shaft passes through the hull.

In a fourth aspect the present invention provides a wheel suspension and retraction system for an amphibious vehicle comprising:

a pair of wheels each mounted for rotation on a hub assembly;

suspension linkages for the wheels connecting the hub assemblies to a common rocker member via spring and damper assemblies, one spring and damper assembly for each wheel, with the rocker member mounted for rotation about a pivot axis and a first of the wheels being connected via an associated suspension linkage to the rocker member on one side of the pivot axis and a second of the wheels being connected via an associated suspension linkage to the rocker member on the other side of the pivot axis; and an actuator connected to the rocker member for rotating the rocker member about the pivot axis thereof, with rotation in one sense retracting its wheels to raised marine mode locations and with rotation in an opposite sense protracting the wheels to lowered land mode locations; wherein:

each suspension linkage comprises a suspension arm connected to a hub assembly, which suspension arm constrains the hub assembly to rotate about an axis of rotation running longitudinally fore and aft along the vehicle during wheel retraction and protraction.

In a fifth aspect the present invention provides a wheel suspension and retraction system for an amphibious vehicle comprising:

a pair of wheels each mounted for rotation on a hub assembly;

suspension linkages for the wheels connecting the hub assemblies to a common rocker member via spring and damper assemblies, one spring and damper assembly for each wheel, with the rocker member mounted for rotation about a pivot axis and a first of the wheels being connected via an associated suspension linkage to the rocker member on one side of the pivot axis and a second of the wheels being connected via an associated suspension linkage to the rocker member on the other side of the pivot axis; and an actuator connected to the rocker member for rotating the rocker member about the pivot axis thereof, with rotation in one sense retracting the wheels to raised marine mode locations and with rotation in an opposite sense protracting the wheels to lowered land mode locations; wherein:

the actuator is part of a powered mechanism for rotating the rocker member and is controlled by a driver-operated switch.

In a sixth aspect the present invention provides a wheel suspension and retraction system for an amphibious vehicle comprising:

at least two wheels each mounted on a hub assembly; and for each wheel a suspension linkage linking the associated hub assembly via a spring and damper assembly to an actuator individual to that wheel;

wherein each actuator is operable to retract the single wheel associated therewith from a lowered ground-engaging land mode position to a raised marine mode position.

In a seventh aspect the present invention provides a wheel suspension arrangement for an amphibious vehicle, the suspension arrangement having a wet side exposed in use to water through which the vehicle travels and a dry side shielded from exposure to the water, the suspension arrangement comprising:

a swing arm having rotatably mounted thereon a wheel hub;

a shaft on which the swing arm is mounted, the shaft being rotatably mounted in the suspension assembly and the shaft and swing arm rotating together;

a spring and a damper both acting on the shaft; and a barrier separating the wet side from the dry side; wherein:

the shaft extends through the barrier from the wet side to the dry side;

the swing arm is attached to a part of the shaft lying on the wet side of the barrier;

the spring and the damper are both attached to a part of the shaft lying on the dry side of the barrier; and a seal provides a water resistant seal around the shaft as the shaft passes from the wet side to the dry side.

The invention is particularly applicable for sit-astride type amphibious vehicles.

These and other features and advantages of the present invention will become apparent from the following detailed description of preferred embodiments which, taken in conjunction with the accompanying drawings, illustrate by way of example the principles of the invention.

BRIEF DESCRIPTION OF THE DRAWINGS

The invention will now be described, by way of example only, with reference to the accompanying drawings, in which.

DETAILED DESCRIPTION OF THE PREFERRED EMBODIMENTS

Figure 1:
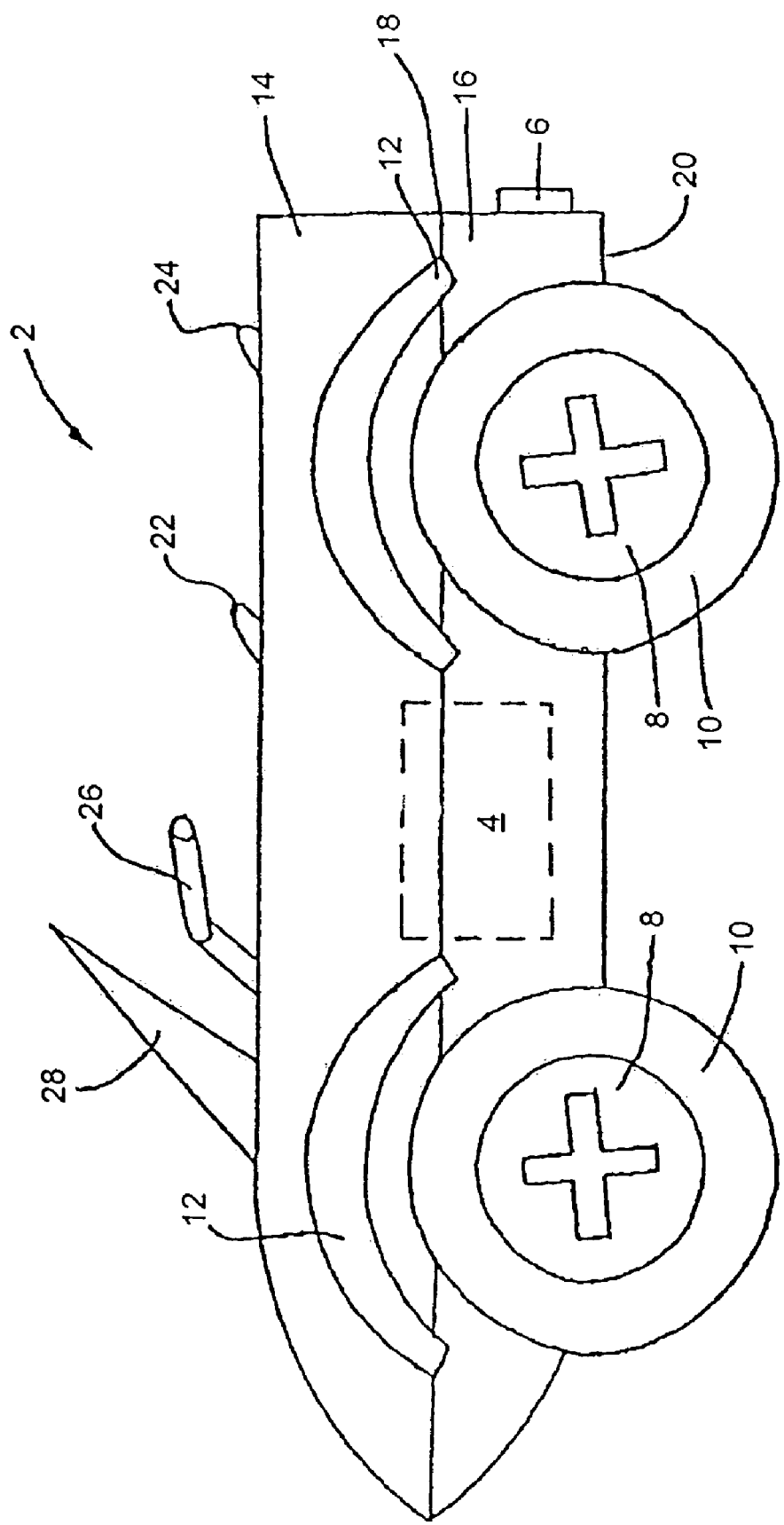
FIG. 1 is a schematic view from the side of an amphibious vehicle in accordance with a preferred embodiment of the invention.

Referring to FIG. 1, an amphibious vehicle, in accordance with a preferred embodiment of the invention, is indicated generally at 2. The amphibious vehicle 2 is of the "sit astride" type, of the kind similar to a motorcycle, jet-ski, quad bike or the like.

The amphibious vehicle 2 has a main body 14 and a hull 16, which are formed separately and joined at a split line indicated at 18. A driver's seat 22 is provided on the main body 14, along with a passenger seat 24 astern of the driver's seat 22. Although only a single passenger seat 24 is illustrated, more than one passenger seat may be provided. The axis of the seating is arranged on the longitudinal axis of the vehicle, or parallel thereto. Handlebars 26 are provided in front of the driver's seat 22, with a windscreen 28 mounted in front of the handle bar 26.

The lower surface of the hull 16 has a planing surface 20, for marine travel. Mounted in the hull 16, the amphibious vehicle 2 has a prime mover 4, typically an internal combustion engine, to provide both marine drive and locomotion. The axis of the prime mover 4 may be along, or parallel to, the longitudinal axis of the vehicle 2.

Marine drive is facilitated by marine drive means 6 mounted at the rear of the hull 16, to the right as viewed in FIG. 1. This may be in the form of a jet-type propulsion arrangement, connected to the prime mover 4 by a marine transmission (not shown) or a propeller. The vehicle has a front pair of wheels on transversely opposite sides (i.e. the left and right sides) of the vehicle and a rear pair of wheels on transversely opposite sides of the vehicle. In the FIG. 1 there can be seen wheels 8 and tyres 10. Only one side of vehicle is shown in FIG. 1, although it will be understood that the other side is a mirror image. The rear wheels and/or the front wheels are driven by the prime mover 4 through a road transmission (not shown) mounted within the hull 16. The wheels 8 and tyres 10 are shielded by wheel arches 12 provided on the hull 16.

In use, during marine travel the vehicle 2 is configured to sit in water with the water line substantially in line with or below the split line 18 between the main body 14 and hull 16. The vehicle 2 will sit substantially "nose up", i.e. with the front end of the vehicle, to the left as viewed in FIG. 1, at a higher level than the rear end of the vehicle 2.

Figure 2:
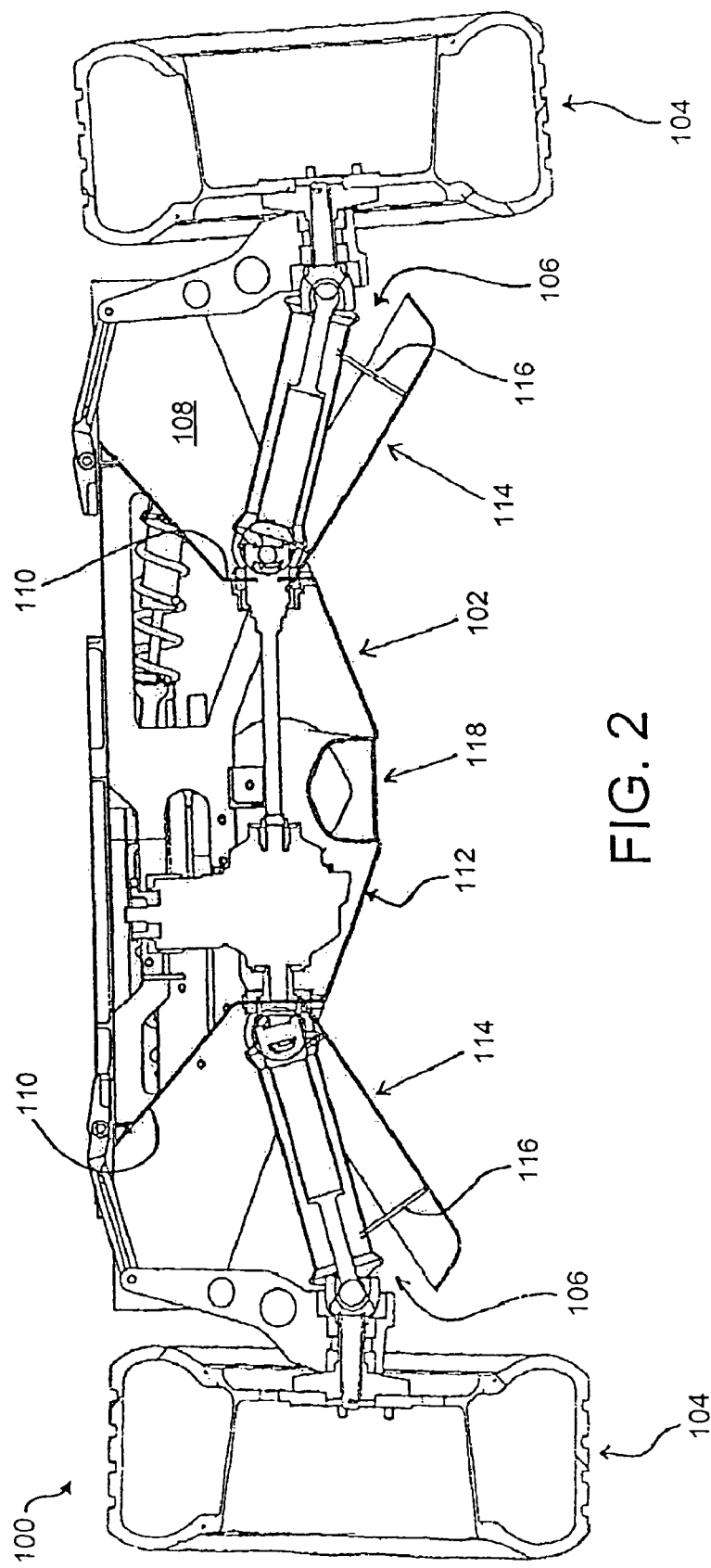
FIG. 2 is a schematic, part cross-sectional view from the front of part of an amphibious vehicle in accordance with another preferred embodiment of the invention, similar to that shown in FIG. 1, with the rear road wheels in an extended position.
Figure 3:
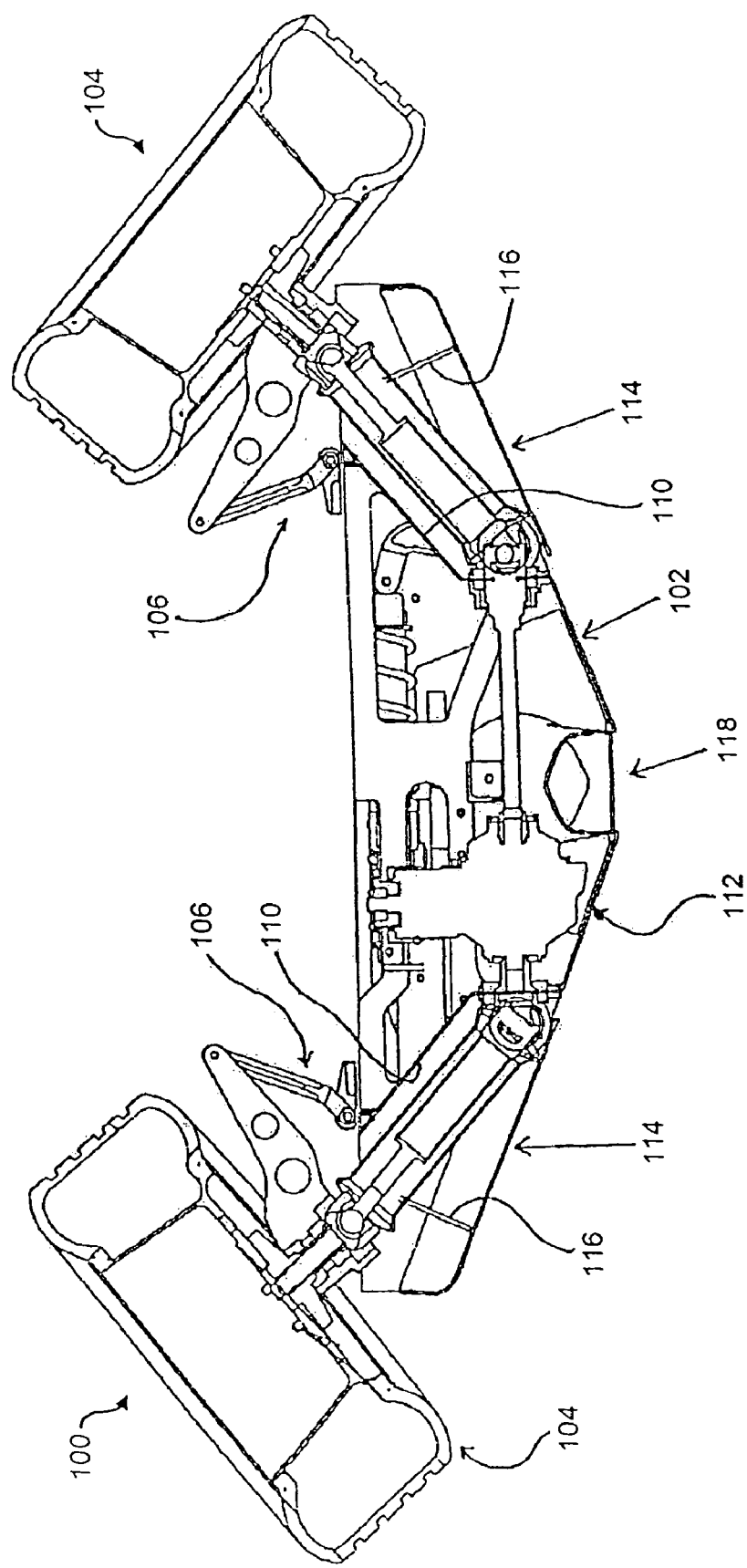
FIG. 3 is a view similar to FIG. 2, showing the rear road wheels in a retracted position.

Referring now to FIGS. 2 and 3, a schematic part cross-sectional view from the front of an amphibious vehicle is indicated generally at 100. The vehicle 100 is in accordance with a preferred embodiment of the invention and is the same as or similar to that illustrated in FIG. 1. However, only the hull of the vehicle and associated components are illustrated, with particular emphasis on the rear axle of the vehicle.

The rear axle of the vehicle 100 incorporates two driven road wheels 104 supported by in-board wheel suspension arrangements indicated at 106 (described in more detail below with reference to FIGS. 4 to 7). The wheel suspension arrangements are coupled to a wheel retraction mechanism, as will be described later. Hull slots 108 are formed as recesses on either side of the hull 102, each having an internal wall 110 dividing the hull gap from the inboard side of the hull 102. A portion of each wheel retraction arrangement 106 extends outboard from each hull slot 108. The road wheels 104 are mounted such that they can be moved between a ground engaging, lowered, protracted position in which the wheels 104 are each aligned generally vertically, such that the hull 102 can be supported clear of the ground on the wheels 104 (as shown in FIG. 2) and a retracted position in which they are elevated for use of the vehicle 100 on water and tilted relative to the vertical (as shown in FIG. 3). The retractability of the wheels 104 helps the vehicle 100 to plane over water.

The hull 102 has a substantially V-shaped profile in cross-section over a majority of its length and has a lower surface 112, which incorporates a planing surface for marine travel of the vehicle 100. The lower surface 112 includes covers 114 provided on either side of the vehicle 100 for each hull slot 108. Rods 116 connect the covers 114 to the wheel retraction arrangements, so that the covers 114 move with the wheel retraction arrangements during retraction or protraction of the road wheels 104, as will be apparent from a comparison of FIGS. 2 and 3. The covers 114 provide a substantially smooth planing surface when the wheels are retracted, as shown in FIG. 3. In the retracted position, the covers 114 also reduce the amount of water entering the hull slots 108 during marine travel.

The hull 102 further includes a recess 118 which forms a water inlet for the jet drive of the vehicle, the periphery of which is also sealed for preventing the inboard passage of undesired moisture and detritus.

For the avoidance of doubt, references to "vertical" or "vertically" throughout this specification, including the claims, should be understood as relating to a direction from top to bottom (or vice versa) of the vehicle when it is supported by its wheels or by its hull in an orientation conventional for locomotion on land, rather than a direction that is necessarily orthogonal to the horizontal.

For ease of description, the wheel retraction and suspension arrangement for the rear axle arrangement shown in FIGS. 2 and 3 shall now be described with reference to FIGS. 4 to 7.

Figure 4:
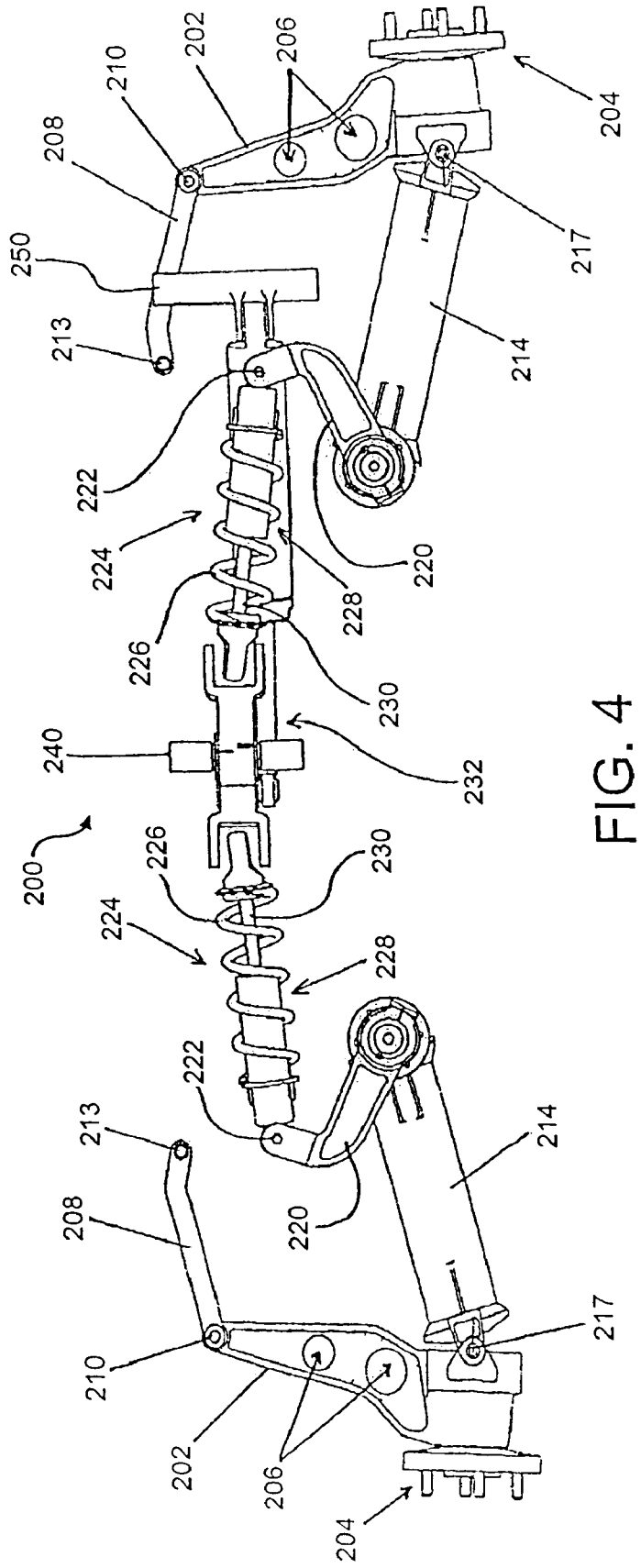
FIG. 4 is a schematic view from the rear of the wheel retraction arrangement for the rear axle of the amphibious vehicle shown in FIGS. 2 and 3, with the rear road wheels in an extended position.
Figure 5:
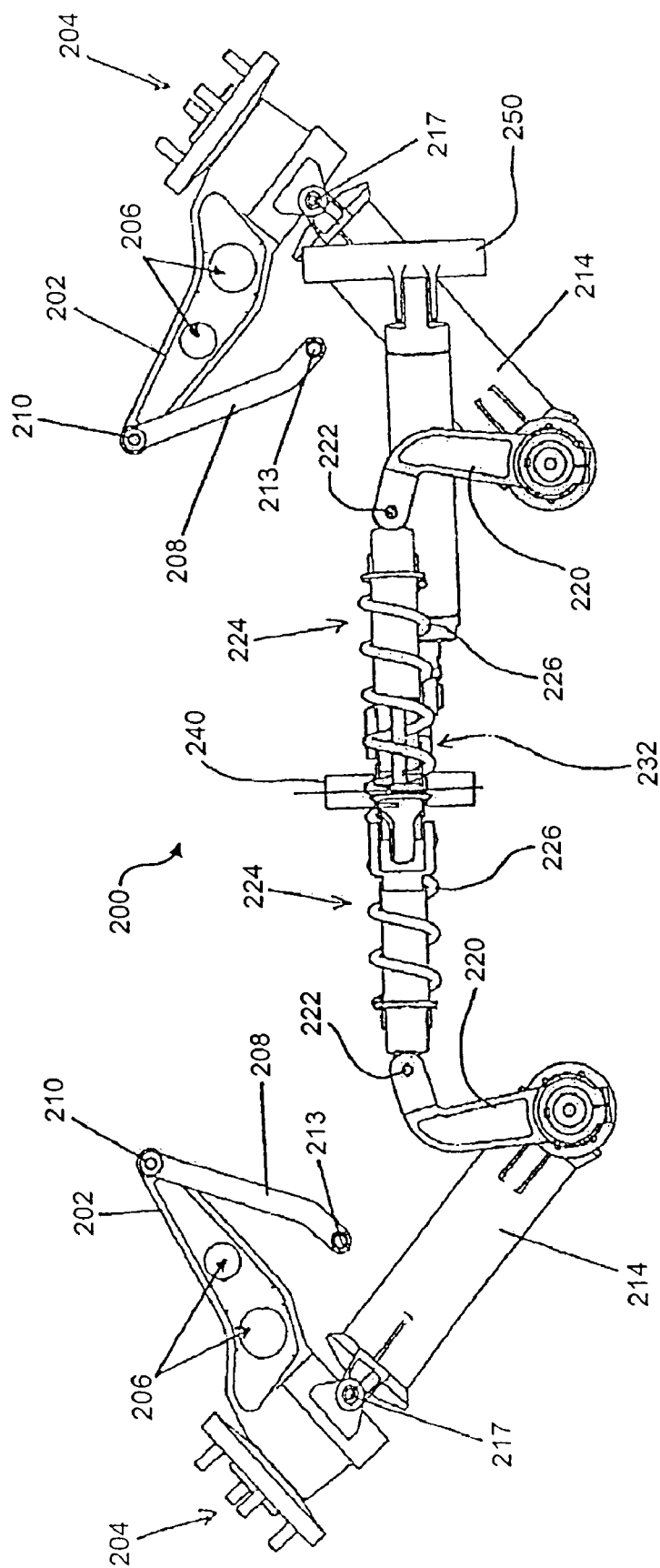
FIG. 5 is a view similar to FIG. 4, showing the rear road wheels in a retracted position.

The rear axle arrangement is indicated generally at 200 and includes a pair of suspension upright members 202, each having a wheel hub 204 mounted thereon. Each upright member 202 and wheel hub 204 forms a wheel hub assembly. The term "upright" should be understood not to imply that the member extends vertically, but that it is the member to which upper and lower suspension arms are connected with their points of attachment spaced vertically. As can be seen in FIGS. 4 and 5, the suspension upright members 202 have drilled out portions, indicated at 206, which reduce the overall weight of the rear axle 200. An upper suspension arm 208 is pivotally connected to the upper end of each suspension upright 202 by a pivot 210. The upper suspension arms 208 are substantially H-shaped, as can be seen most clearly in FIG. 6, which also shows that the upper end of the suspension uprights 202 are received between opposing limbs 212 at one end of a respective upper suspension arm 208. The proximal end of each upper suspension arm 208, closest to a centre line of the vehicle, is adapted to be pivotally connected to the chassis or hull of the vehicle, or to a subframe for the rear axle 200, if provided, by means of bearings 213 formed in the other opposing limbs 215 of the upper suspension arms 208, for receiving a pivot pin or the like.

A lower suspension arm 214 is pivotally connected to the lower end of each suspension upright 202 by means of a pivotal connection, as indicated at 217 in FIGS. 4 and 5.

Figure 6:
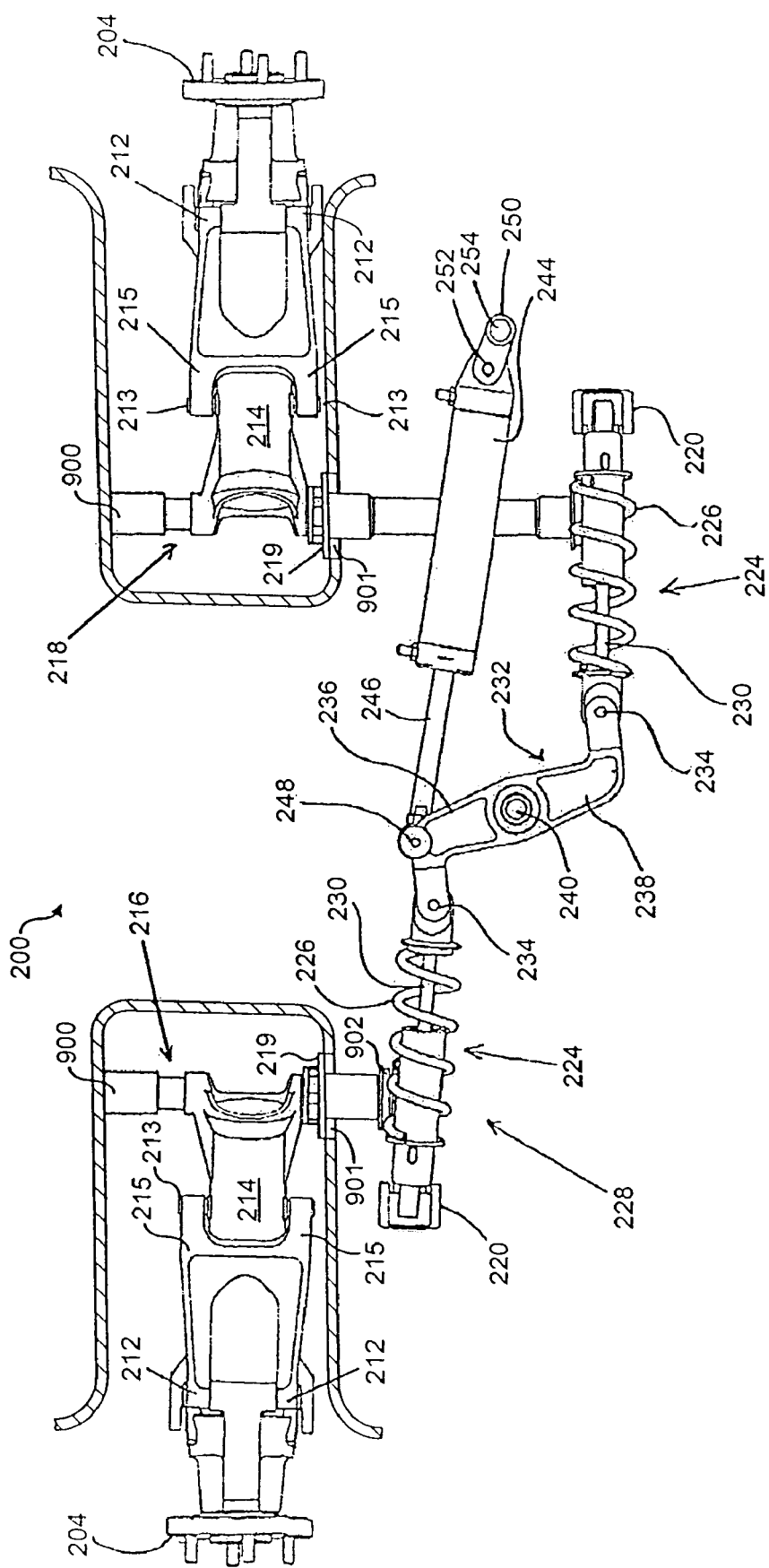
FIG. 6 is a schematic view from the above of the wheel retraction arrangement as shown in FIG. 4.
Figure 7:
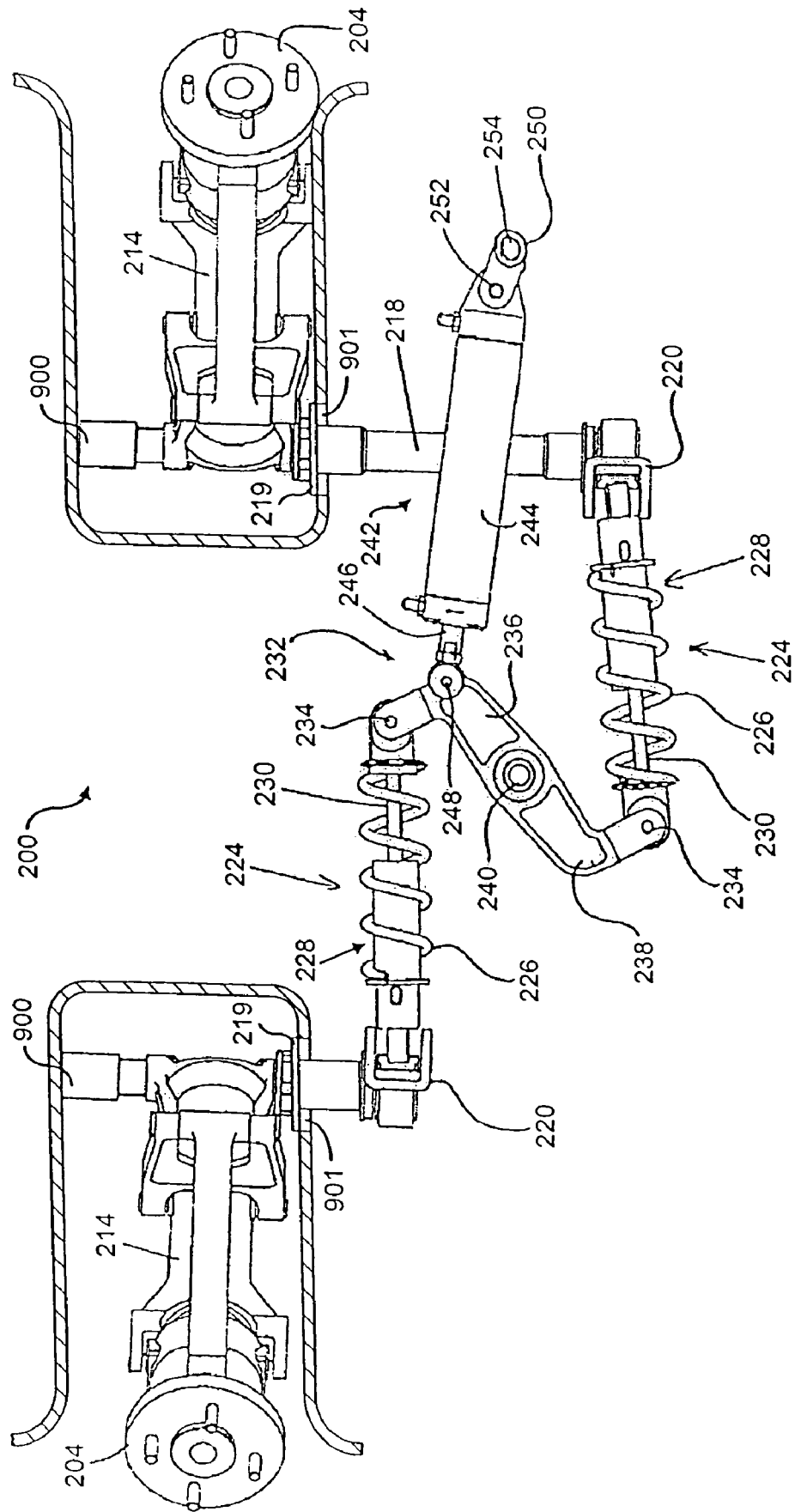
FIG. 7 is a schematic view from the above of the wheel retraction arrangement as shown in FIG. 5.

As can be seen most clearly in FIGS. 6 and 7, a pair of torsion tubes (i.e. shafts which relay torsional loading) 216, 218 are arranged parallel to one another and to be parallel with the longitudinal axis of the vehicle. The lower suspension arms 214 are rotatably mounted about respective torsion tubes 216, 218, so as to be orthogonal thereto and configured to rotate with said torsion tubes. Each torsion tube is rotatably mounted at one end in a bearing 900 externally mounted on a part of the hull surface forming the slot 108. Each torsion tube at the other end passes through an annular seal 901 into the interior of the hull and is then supported in a bearing 902 inside the hull.

The arrangement ensures that each wheel suspension needs only one aperture through the hull below the waterline and this aperture can easily be sealed by an annular seal such as lip seal or a shaft seal and avoids the need for a diaphragm seal (which can be difficult to make watertight). If preferred the bearing 900 could also be mounted inboard of the hull, in which case the torsion tubes 216 and 218 would extend through two aligned apertures in the hull, with annular seals provided to seal around each aperture.

The annular seals could be inboard. A flange 219 is provided on each of the torsion tubes 216, 218, (at the lower ends thereof as viewed in FIGS. 6 and 7). These flanges 219 sealingly abut annular seals connected in respective walls of the hull gaps, in use, for preventing the passage of water etc to components inboard of the hull. Hence, in use, only a section of the torsion tubes 216, 218 extends across the respective hull gaps, between the two sealed connections described above.

Referring back to FIGS. 4 and 5, a dedicated spring and damper assembly, indicated generally at 224, is provided for each road wheel. The spring and damper assemblies 224 are operatively coupled to a respective torsion tube 216, 218 by a link arm 220. The lower end of each link arm 220 is fixedly coupled to the second end of a respective torsion tube 216, 218 (i.e. towards the bottom of FIGS. 6 and 7) and the upper end of each link arm 220 is pivotably connected to a respective spring and damper assembly 224 by means of a pivotal connection 222.

The two spring and damper assemblies 224 are mounted substantially parallel to one another when viewed in plan (FIG. 6) and aligned substantially in the same horizontal plane when viewed from the rear of the hull (FIG. 4). They extend transversely across the vehicle, i.e. from left to right.

The spring and damper assemblies 224 include a coil spring 226 disposed around a telescopic damper unit 228 having a push rod 230. The components of the suspension arrangements 224 are of known construction and are not described in detail.

The inner ends of push-rods 230 are both pivotably connected to a common rocker member 232 by means of a pivotal connection 234, visible in FIGS. 6 and 7. The pivotal connections 234 are contained in spherical bushings, known as Rose (RTM) joints. The rocker member 232 has a main body, substantially Z-shaped in plan view, as seen in FIGS. 6 and 7, which defines a pair of limbs or end sections 236, 238. A rocker arm pivot shaft 240 extends through a central section of the rocker member 232, orthogonal to the limbs 236, 238 and is aligned vertically within the vehicle in use; i.e. the rocker member 232 rotates in a substantially horizontal plane. The upper and lower ends of the shaft 240 are intended to be fixedly connected to the chassis or hull of the vehicle, or to a subframe for the rear axle 200, if provided (for example as shown at 302 in FIG. 8, described below), and the main body of the rocker arm 232 is adapted to rotate about the shaft 240.

The relationship between the rocker member 232 and spring and damper assemblies 224 is such that the rocker member 232 maintains the two spring and damper assemblies in a spaced apart relationship with respect to the longitudinal axis of the vehicle.

A hydraulic actuator indicated at 242 in FIGS. 6 and 7, is provided as part of a powered wheel retraction mechanism 200. The actuator 242 has a double acting hydraulic cylinder 244 and a piston rod 246. One end of the piston rod 246 is operatively received in the cylinder 244, with the other end pivotably connected to the rocker member 232 by means of a pivotal connection 248 at the end of the rocker limb 236. The distal end of the cylinder portion 244 is pivotably connected to a mounting member 250 by means of a pivot pin connection 252, such that the cylinder portion 244 pivots through a small angle about pin connection 252 during retraction/protraction. The mounting member 250 is intended to be fixedly connected, in use, to the chassis or hull of the vehicle, or to a subframe for the rear axle 200, if provided. However, mounting member 250 includes an internal pivot 254, viewable in FIG. 6, so as to be rotatably adjustable about a vertical axis during installation, for example to set the ride height of the suspension.

As will be appreciated from FIGS. 1 to 3, the retraction means is located below the split line 18 between hull 16 and upper body 14, and above the effective axis of rotation of the wheels for the rear axle during locomotion, such as in the protracted position shown in FIG. 2. The arrangement is particularly compact in the vertical plane, so as to be effectively accommodated in the space available in the hull of the amphibious vehicle.

The arrangement shown in FIGS. 4 to 7, in particular the retraction assembly 242, is adapted for communication with a remote control means. In a preferred embodiment, an amphibious vehicle such as that shown in FIG. 1, or as illustrated and described with reference to FIGS. 2 and 3, and FIGS. 4 to 7, includes an on-board controller, not illustrated, which is located on the main body of the vehicle, in the vicinity of the driver's seat position. The controller is in communication with the retraction assembly 242, for sending signals to actuate retraction or protraction of the road wheels, as required. The controller is also configured for controlling other aspects of the conversion from land mode to marine mode, or vice versa.

A typical operation of the preferred embodiment will now be described, with particular reference to FIGS. 2 and 3, and FIGS. 4 to 7.

If it is desired to move the wheels 104 from the protracted position shown in FIG. 2 to the retracted position shown in FIG. 3, a control signal is communicated from the on-board controller to the wheel retraction assembly 242, in particular to the hydraulic cylinder 244. In response to the signal, the cylinder 244 acts to retract push rod 246 under hydraulic pressure from the extended position shown in FIG. 6. As the push rod 246 is retracted to the position shown in FIG. 7, the end of the limb 236 on the rocker member 232 is pulled in the direction of the cylinder 244, to the right as viewed in FIGS. 6 and 7. As the push rod retracts, the rocker member 232 is caused to rotate about the shaft 240, such that the ends of the limbs 236, 238 of the rocker arm 232 prescribe an arcuate, generally circular path. For at least part of this arcuate path, the end of limb 236, and the various suspension components connected thereto, will move in a direction substantially parallel to the movement of actuator 244.

Rotation of the rocker member 232 in this manner causes the spring and damper assemblies 224 to be pulled 'inboard', from the extended position shown in FIG. 6 to the retracted position shown in FIG. 7. In the extended position, the spring and damper assemblies 224 are maintained by the rocker member 232 in a spaced apart relationship in both the longitudinal axis of the hull and in the transverse axis of the hull (from left to right as viewed in FIG. 6). During the inboard movement referred to above, the suspension arrangements proscribe a shallow arc as they move from the transversely spaced relationship to a retracted position in which they partially overlap one another in said transverse direction (as can be seen in FIG. 7). This 'overlapping' movement is particularly advantageous in reducing the space taken up by the suspension arrangements 224 across the body of the vehicle, resulting in a compact retracted configuration.

The arrangement of the components 224 and 232 defines a substantially Z-shaped mechanism, with the suspension arrangements 224 forming acute angles with the rocker member 232 when the suspension is retracted. The mechanism is hinged at its vertices so that the angle between a respective suspension arrangement 224 and the rocker member 232 becomes more acute during retraction of the actuator piston rod 246, that is to say that the angle between the suspension arrangement 224 and the rocker member 232 decreases during retraction. The mechanism is such that the retraction of the actuator piston rod 246 causes the two spring and damper assemblies 224 to fold together, relative to the rocker member 232, as can be seen from a comparison of FIGS. 6 and 7.

The inboard movement of the suspension arrangements 224 causes the upper ends of the link arms 220 to pivot inwardly with respect to the longitudinal axis of the vehicle, as viewed in FIGS. 4 and 5. Since the link arms are fixedly coupled to the torsion tubes 216, 218, movement of the link arms 220 in this manner causes a simultaneous rotation of the torsion tubes 216, 218. As viewed in FIGS. 4 and 5, the torsion tube 216 on the left hand side of the vehicle rotates in a clockwise direction, whereas the torsion tube 218 on the right hand side of the vehicle rotates in an anti-clockwise direction.

Rotation of the two torsion tubes 216, 218 is imparted to the lower suspension arms 214, so that the outer ends move outwardly and upwardly with respect to the longitudinal axis of the vehicle, as will be apparent from a comparison of FIGS. 4 and 5.

The suspension upright members 202 are connected to the rest of the rear axle arrangement 200 through the upper and lower suspension arms 208, 214, so that they move upwardly to the retracted position shown in FIG. 5 with the movement of the lower suspension arms 214. The upper suspension arms 208 are connected to the vehicle chassis, hull or support frame (whichever is appropriate) by pivot pins 213, so that a first end of each support arm 208 is raised above the other respective end connected to the vehicle, to the position shown in FIG. 5, as the suspension upright members 202 move upwardly.

Since the wheel hubs 204 are connected to the suspension upright members 202, the actuation of the retraction arrangement in the manner described above acts to move the rear wheels of the vehicle to a retracted position, as shown in FIG. 3. The wheel retraction arrangement is configured such that the wheels 104 arrive at their fully retracted position simultaneously with the arrival of the piston rod 246 being fully received in the hydraulic cylinder 244 of the retraction assembly 242. With the wheels 104 in the retracted position, the vehicle is more suited to marine travel than with the wheels 104 in an extended or protracted position, due to the reduction of hydrodynamic drag as the wheels are lifted out of the water.

As described above, the retraction assembly 242 includes a member 232, which is configured to rock about a pivot point 240, with this movement being translated to the suspension upright members 202 for retracting or protracting both wheel hubs 204, in a single operation.

As can be seen from FIGS. 4 and 5, retraction of the wheels causes the spring and damper assemblies 224 to move from an angled position relative to the horizontal to a substantially horizontal attitude, with the damper unit ends of the suspension arrangements being moved upwardly as they pivot with respect to their respective link arms 220. Nevertheless, in the retracted position, the spring and damper arrangements 224 are maintained below the upper boundary of the hull, i.e. below the split line between the hull and body, in use.

If it is desired to move the wheels from the retracted position shown in FIG. 3 to the extended position shown in FIG. 2, the on-board controller is operated to send a further signal to the retraction assembly 242, to cause the push rod 246 to be extended from the cylinder 244 under hydraulic pressure. As will be understood, having regard for the above description of the wheels being retracted, actuation of the cylinder 244 in this way causes an opposite movement of the rocker member 232 to that described above, to push the two spring and damper assemblies 224 outboard, to rotate the torsion tubes 216, 218 in the opposite direction and thereby lower the suspension upright members 202. The motion of each component in the rear axle arrangement 200 during protraction of the wheels in this manner will be readily apparent to the skilled addressee on the basis of the above description and is therefore not described in further detail.

In a further preferred embodiment of the invention, the wheels at the front axle of the amphibious vehicle, for example as shown in FIG. 1 or described with reference to FIGS. 2 and 3 and 4 to 7, are also capable of being moved between retracted and extended positions.

Figure 8:
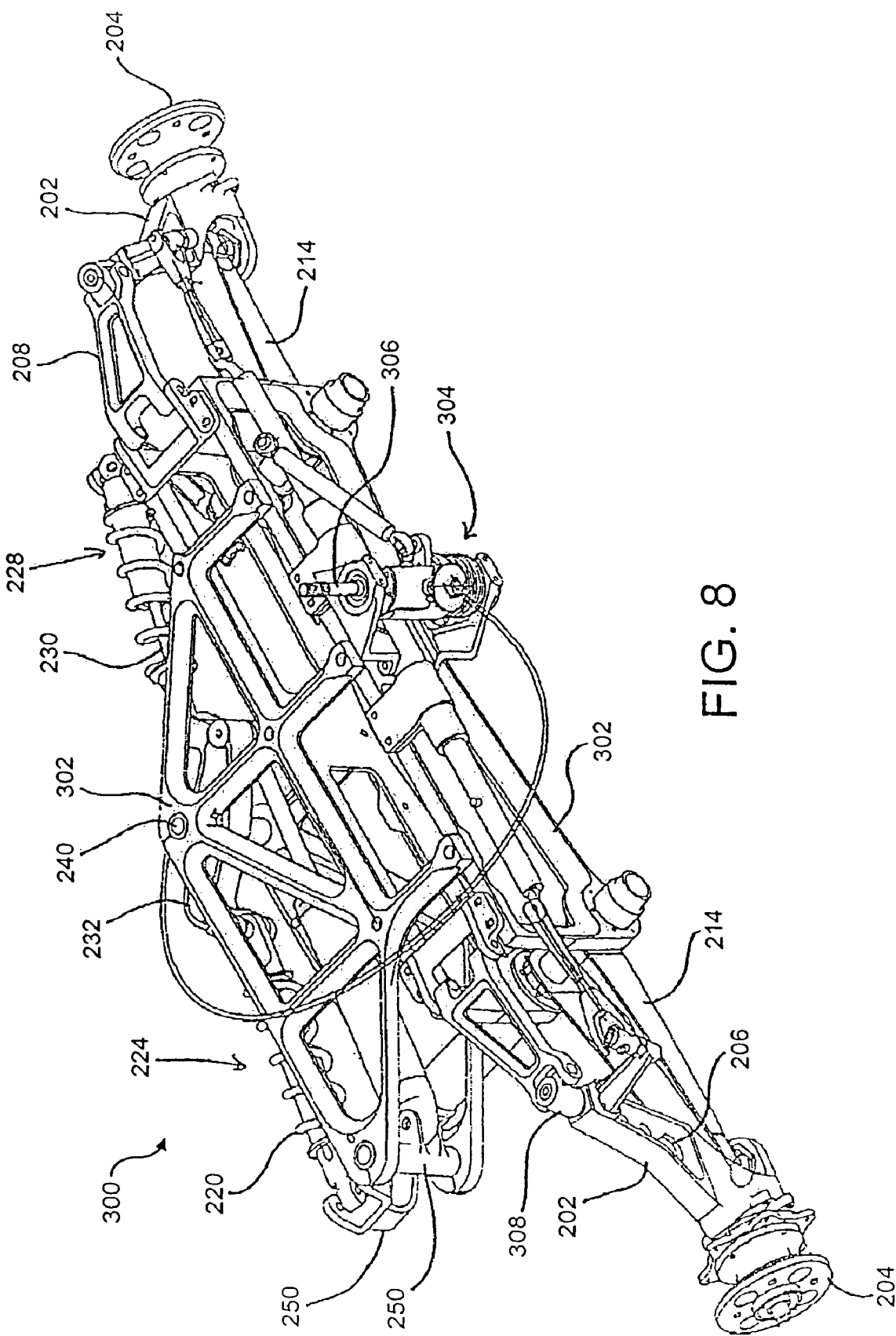
FIG. 8 is a schematic perspective view from the rear of the front axle of an amphibious vehicle in accordance with a further preferred embodiment of the invention, similar to that shown in FIG. 1 and FIGS. 2 to 7.
Figure 9:
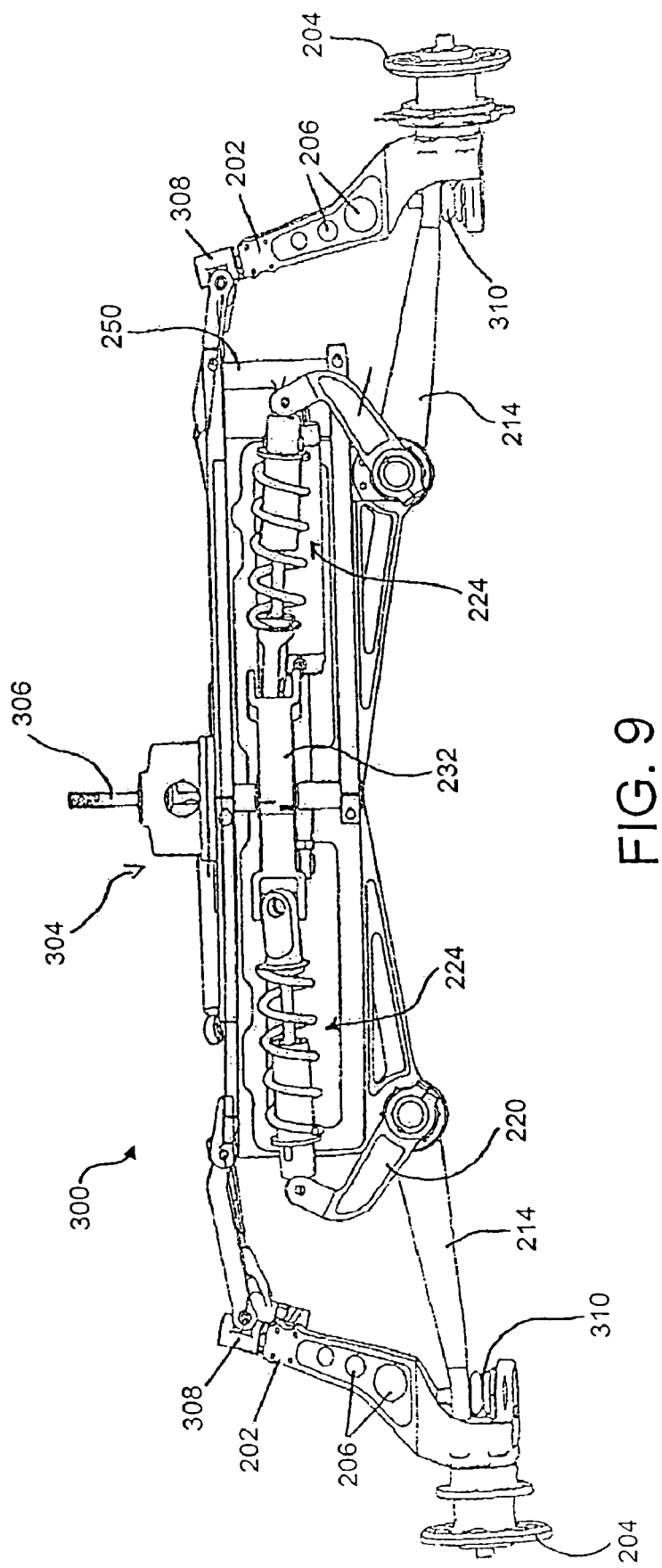
FIG. 9 is a schematic view from the front of the front axle arrangement shown in FIG. 8.

A preferred front axle arrangement is shown in FIGS. 8 and 9, for illustrative purposes. Similar components to those described with reference to FIGS. 2 to 7 are given the same reference numerals in FIGS. 8 and 9 and will not be described in significant detail.

The front axle arrangement, indicated at 300, is mounted on a suspension support frame or subframe structure 302, which is configured for mounting in the hull of an amphibious vehicle, such as that shown in FIG. 1. As can be seen, the mounting member 250 for the retraction assembly 242 is fixedly bolted to the subframe 302 and is arranged substantially vertically, so that the actuator 244 is mounted horizontally within the subframe 302, above the effective axis of rotation of the wheels of the vehicle. The upper suspension arms 208 are also connected to the subframe 302 for pivotable movement, by pivots 213 as shown in FIGS. 5 and 6.

A steering assembly, indicated at 304, is also mounted on the support frame 302 in communication with the suspension upright members 202, so as to steer the vehicle on land in a manner well known in the art. The steering assembly 304 includes a steering box input shaft 306, rotatably mounted on the support frame 302, for communication between the wheel hubs 204 and manually operated steering means, for example a handle bar or steering wheel type arrangement, attached to the main body of the amphibious vehicle.

As will be understood from FIGS. 8 and 9, the upper end of the suspension upright members 202 includes a trunnion mount 308, which is used to rotatably mount upright 202 to upper arm 208, for steering the front wheels (via hubs 204). Likewise, ball joints 310 are provided between the lower ends of the suspension upright members 202 and the lower suspension arms 214, to facilitate steering of the wheel hubs 204.

The general construction and operation of the wheel retraction and suspension arrangements shown in FIGS. 8 and 9 is substantially similar to that shown in FIGS. 2 to 7, as will be appreciated by the skilled addressee, and therefore is not described further.

Figure 10:
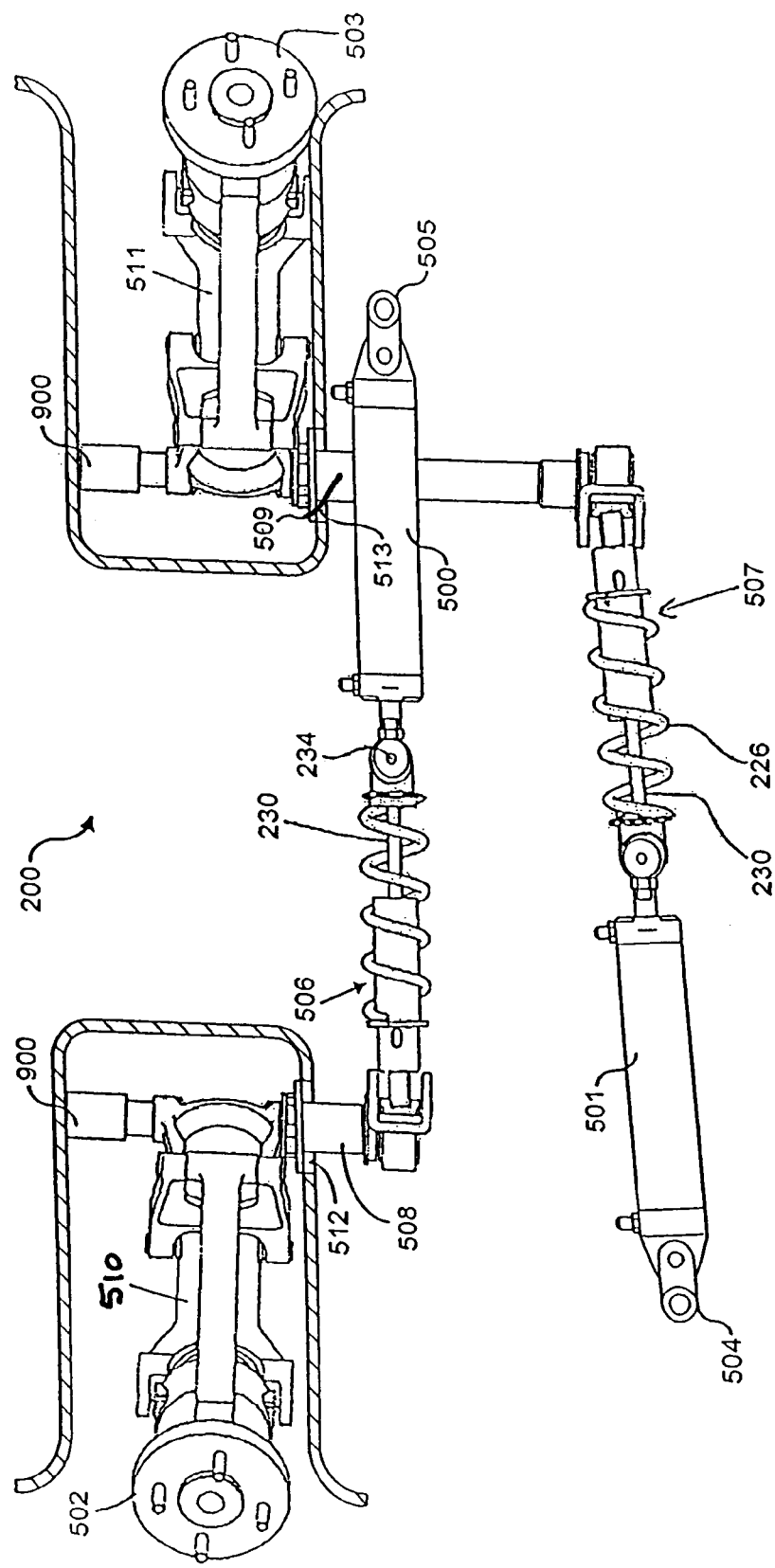
FIG. 10 is a schematic view from above of a further embodiment of the wheel retraction arrangement according to the invention.

FIG. 10 shows an alternative arrangement of wheel retraction mechanism. In it a pair of hydraulic actuators 500 and 501 are used, one for each hub assembly 502, 503. Each actuator 500 is pivotally mounted to a supporting structure by a pivotal connection 504, 505. Each actuator is connected via a spring and damper assembly 506, 507 and a torsion tube 508, 509 to a lower suspension arm 510, 511 which rotates with the torsion tube 508,509, thereby raising and lowering hub assemblies 502, 503 pivotally connected to the suspension arms 510, 511. As described above, annular seals 512, 513 seal around the torsion tubes 508, 509 to prevent ingress of water into the interior of the vehicle. Each wheel suspension thereby has a wet side (outboard parts of the torsion tubes 508,509 and suspension arms e.g. 510, 511) and a dry side (inboard parts of the torsion tubes 508,509 and the spring and damper assemblies 506, 507).

Figure 11:
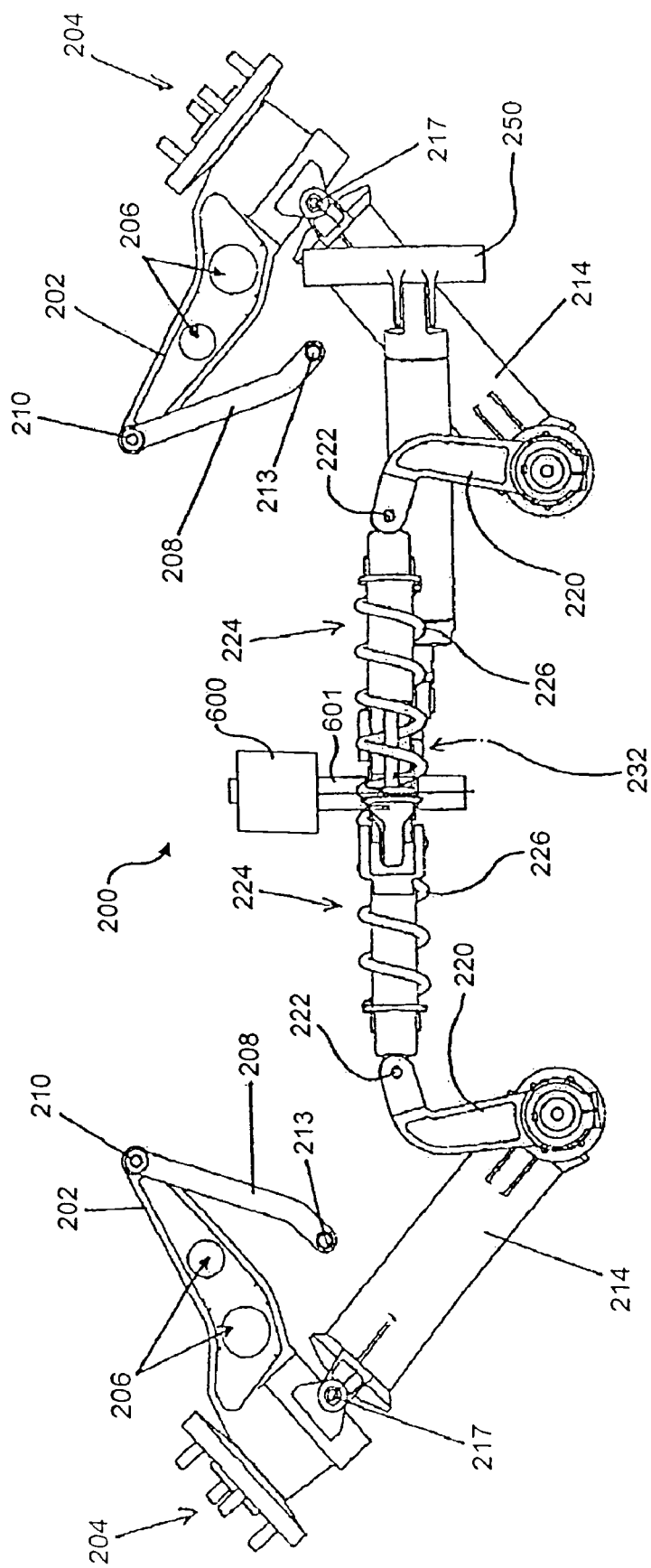
FIG. 11 is a view similar to that of FIG. 5, showing a yet further embodiment of the wheel retraction arrangement according to the invention.

Whilst above a hydraulic system of actuation is described, an electrical motor system (e.g. an arrangement of a threaded spindle engaged by a rotating nut) or a pneumatic cylinder system could be used. FIG. 11 shows a view of an embodiment of the invention which uses an electric motor 600 instead of hydraulic actuators. The FIG. 11 corresponds to FIG. 5 previously described and components in common are given identical reference numerals. The electric motor 600 is mounted in the vehicle to have an output shaft 601 which forms the axis of rotation of the rocker shaft, with the rocker shaft rotating on rotation of shaft 601 by motor 600. The motor 600 will be controlled by a driver-operated switch in the vehicle cabin.

It can be seen that the present invention provides compact and versatile wheel retraction and suspension arrangements for an amphibious vehicle. In the preferred embodiments, a single actuator is mounted horizontally within the vehicle, for lifting and lowering wheels on either side of the vehicle at each axle. The hydraulic wheel retraction arrangement is effectively isolated from the individual coil springs and dampers, which enables spring and damper rates to be tuned independently of the wheel retraction actuator.

Whereas the invention has been described in relation to what are presently considered to be the most practical and preferred embodiments, it is to be understood that the invention is not limited to the disclosed arrangements but rather is intended to cover various modifications and equivalent constructions included within the spirit and scope of the invention. Where three road wheels are provided, the retraction arrangements described above could be used for two transversely aligned wheels, and a separate system provided for the one remaining wheel. Accordingly, it is not intended that the invention be limited except by the appended claims.

What is claimed is:

1. A wheel suspension and retraction system for an amphibious vehicle, comprising:

a pair of wheels spaced apart transversely across the vehicle, each wheel mounted for rotation on a hub assembly;

suspension linkages for the wheels connecting the hub assemblies to a common rocker member via spring and damper assemblies, one spring and damper assembly for each wheel, with the rocker member mounted for rotation about a pivot axis and a first of the wheels being connected via an associated suspension linkage to the rocker member on one side of the pivot axis and a second of the wheels being connected via an associated suspension linkage to the rocker member on the other side of the pivot axis;

an actuator connected to the rocker member for rotating the rocker member about the pivot axis thereof, with rotation in one sense retracting the wheels to raised marine mode locations and with rotation in an opposite sense protracting the wheels to lowered land mode locations; wherein:

the suspension linkages each extend transversely across the vehicle to the rocker member which is mounted for rotation at a location lying inboard of the pair of wheels.

2. A wheel suspension and retraction system as claimed in claim 1, wherein the rocker member is Z-shaped, with a central section through which the pivot axis extends and end sections angled with respect to the central section; and the suspension linkages are pivotally connected to the end sections.

3. A wheel suspension and retraction system as claimed in claim 1, wherein the amphibious vehicle comprises a hull and each hub assembly is connected to a suspension arm which extends radially from a shaft and rotates with the shaft, the suspension arm and the shaft forming parts of the suspension linkage for the hub assembly; and wherein the shaft extends through the hull and an annular seal provides a water resistant seal around the shaft as the shaft passes through the hull.

4. A wheel suspension and retraction system as claimed in claim 1, wherein the actuator is a part of a powered mechanism for rotating the rocker member and is controlled by a driver-operated switch.

5. A wheel suspension and retraction system as claimed in claim 1, wherein each hub assembly is connected to a suspension arm rotatable about an axis which runs longitudinally fore and aft along the vehicle.

6. A wheel suspension and retraction system for an amphibious vehicle, comprising:
  a pair of wheels each mounted for rotation on a hub assembly;
  suspension linkages for the wheels connecting the hub assemblies to a common Z-shaped rocker member via spring and damper assemblies, one spring and damper assembly for each wheel, the rocker member having a central section through which passes a pivot axis of the rocker member, a first of the wheels being connected via an associated suspension linkage to one end section of the rocker member on a first side of the pivot axis and a second of the wheels being connected via an associated suspension linkage to the other end section of rocker member on the other side of the pivot axis; and
  an actuator connected to the rocker member for rotating the rocker member about the pivot axis thereof with rotation in one sense retracting the wheels to raised marine mode locations and with rotation in an opposite sense protracting the wheels to lowered land mode locations.

7. A wheel suspension as claimed in claim 6, wherein the amphibious vehicle comprises a hull; each hub assembly is connected to a suspension arm which extends radially from a shaft and rotates with the shaft, the suspension arm and the shaft forming parts of the suspension linkage for the hub assembly; and wherein the shaft extends through the hull and an annular seal provides a water resistant seal around the shaft as the shaft passes through the hull.

8. A wheel suspension and retraction system as claimed in claim 6, wherein the actuator is part of a powered mechanism for rotating the rocker member and is controlled by a driver-operated switch.

9. A wheel suspension and rotation system as claimed in claim 6, wherein each hub assembly is connected to a suspension arm rotatable about an axis which runs longitudinally fore and aft along the vehicle.

10. A wheel suspension and retraction system for an amphibious vehicle with a hull, the system comprising:
  a pair of wheels each mounted for rotation on a hub assembly;
  suspension linkages for the wheels connecting the hub assemblies to a common rocker member via spring and damper assemblies, one spring and damper assembly for each wheel, with the rocker member mounted for rotation about a pivot axis and a first of the wheels being connected via an associated suspension linkage to the rocker member on one side of the pivot axis and a second of the wheels being connected via an associated suspension linkage to the rocker member on the other side of the pivot axis;
  an actuator connected to the rocker member for rotating the rocker member about the pivot axis thereof with rotation in one sense retracting the wheels to raised marine mode locations and with rotation in an opposite sense protracting the wheels to lowered land mode locations; wherein:
  each suspension linkage comprises a suspension arm pivotally connected at a distal end, the end furthest from a vehicle centre line when the wheels are in their lowered land mode locations, to a hub assembly and attached at a proximal end to a rotatable suspension shaft for rotation with the shaft, the shaft also forming part of the suspension linkage; and
  each rotatable suspension shaft extends though the hull and an annular seal provides a water resistant seal around the shaft as the shaft passes through the hull.

11. A wheel suspension and retraction system as claimed in claim 10, wherein the actuator is part of a powered mechanism for rotating the rocker member and is controlled by a driver-operated switch.

12. A wheel suspension and retraction system as claimed in claim 10, wherein each rotatable suspension shaft runs longitudinally fore and aft along the vehicle.

13. A wheel suspension and retraction system for an amphibious vehicle, comprising:
  a pair of wheels each mounted for rotation on a hub assembly;
  suspension linkages for the wheels connecting the hub assemblies to a common rocker member via spring and damper assemblies, one spring and damper assembly for each wheel, with the rocker member mounted for rotation about a pivot axis and a first of the wheels being connected via an associated suspension linkage to the rocker member on one side of the pivot axis and a second of the wheels being connected via an associated suspension linkage to the rocker member on the other side of the pivot axis; and
  an actuator connected to the rocker member for rotating the rocker member about the pivot axis thereof with rotation in one sense retracting its wheels to raised marine mode locations and with rotation in an opposite sense protracting the wheels to lowered land mode locations; wherein:
  each suspension linkage comprises a suspension arm connected to a hub assembly, which suspension arm constrains the hub assembly to rotate about an axis of rotation running longitudinally fore and aft along the vehicle during wheel retraction and protraction.

14. A wheel suspension and retraction system for an amphibious vehicle as claimed in claim 13, wherein the actuator is part of a powered mechanism for rotating the rocker member and is controlled by a driver operated switch.

15. A wheel suspension and retraction system for an amphibious vehicle, comprising:
  a pair of wheels each mounted for rotation on a hub assembly;
  suspension linkages for the wheels connecting the hub assemblies to a common rocker member via spring and damper assemblies, one spring and damper assembly for each wheel, with the rocker member mounted for rotation about a pivot axis and a first of the wheels being connected via an associated suspension linkage to the rocker member on one side of the pivot axis and a second of the wheels being connected via an associated suspension linkage to the rocker member on the other side of the pivot axis; and an actuator connected to the rocker member for rotating the rocker member about the pivot axis thereof; with rotation in one sense retracting the wheels to raised marine mode locations and with rotation in an opposite sense protracting the wheels to lowered land mode locations; wherein:

the actuator is part of a powered mechanism for rotating the rocker member and is controlled by a driver-operated switch.

16. A wheel suspension and retraction system for an amphibious vehicle, comprising:

at least two wheels each mounted on a hub assembly; and for each wheel a suspension linkage linking the associated hub assembly via a spring and damper assembly to an actuator individual to that wheel, wherein said linkage is further configured such that movement is transferred between said hub and said spring and damper assembly via rotation of a rotatable suspension shaft;

wherein each actuator is operable to retract the single wheel associated therewith from a lowered ground-engaging land mode position to a raised marine mode position.

17. A wheel suspension and retraction system as claimed in claim 16, wherein the two wheels are spaced apart transversely across the vehicle and each suspension linkage extends transversely across the vehicle to connect with the relevant actuator which in turn is mounted in the vehicle to extend transversely thereacross.

18. A wheel suspension and retraction system as claimed in claim 16, wherein each actuator is a part of a powered mechanism and is controlled by a driver-operated switch.

19. A wheel suspension and retraction system as claimed in claim 16, wherein each suspension linkage comprises a suspension arm pivotally connected at a distal end, the end furthermost from a vehicle centre line when the wheels are in their lowered land mode locations, to a wheel hub assembly and attached at a proximal end to said rotatable suspension shaft for rotation with the shaft and wherein each rotatable suspension shaft extends longitudinally fore and aft along the vehicle and extends through a hull of the vehicle with an annular seal providing a water resistant seal around the shaft as the shaft passes through the hull.

20. A wheel suspension arrangement for an amphibious vehicle, the suspension arrangement having a wet side exposed in use to water through which the vehicle travels and a dry side shielded from exposure to the water, the suspension arrangement comprising:

a swing arm having rotatably mounted thereon a wheel hub;

a shaft on which the swing arm is mounted, the shaft being rotatably mounted in the suspension assembly and the shaft and swing arm rotating together;

a spring and a damper both acting on the shaft; and a barrier separating the wet side from the dry side; wherein:

the shaft extends through the barrier from the wet side to the dry side;

the swing arm is attached to a part of the shaft lying on the wet side of the barrier;

the spring and the damper are both attached to a part of the shaft lying on the dry side of the barrier; and a seal provides a water resistant seal around the shaft as the shaft passes from the wet side to the dry side.

* * * * *